United States Patent Office 3,528,748
Patented Sept. 15, 1970

3,528,748
ALIGNMENT OF ADJUSTABLE PARTS
OF A STRUCTURE
James Morriss Burch and John William Charles Gates,
Teddington, England, assignors to National Research
Development Corporation, London, England, a British
body corporate
Filed June 14, 1966, Ser. No. 557,563
Claims priority, application Great Britain, June 15, 1965,
25,270/65
Int. Cl. G01b 11/26
U.S. Cl. 356—138                                       4 Claims

ABSTRACT OF THE DISCLOSURE

The invention is concerned with optical apparatus for use in an alignment system and with a method of aligning adjustable parts in respect to a reference axis, and proposes the use of a single mode laser source of coherent light, and a double image optical system so arranged that a beam entering the system from the source will give rise to two beams emerging from the system symmetrically disposed with respect to a geometrical datum which may be an axis or a plane defined by the system and with a separation which will depend on the orientation of the entering beam, which is to be adjustable so that the two emerging beams may be superposed on one another.

---

Figure 1:
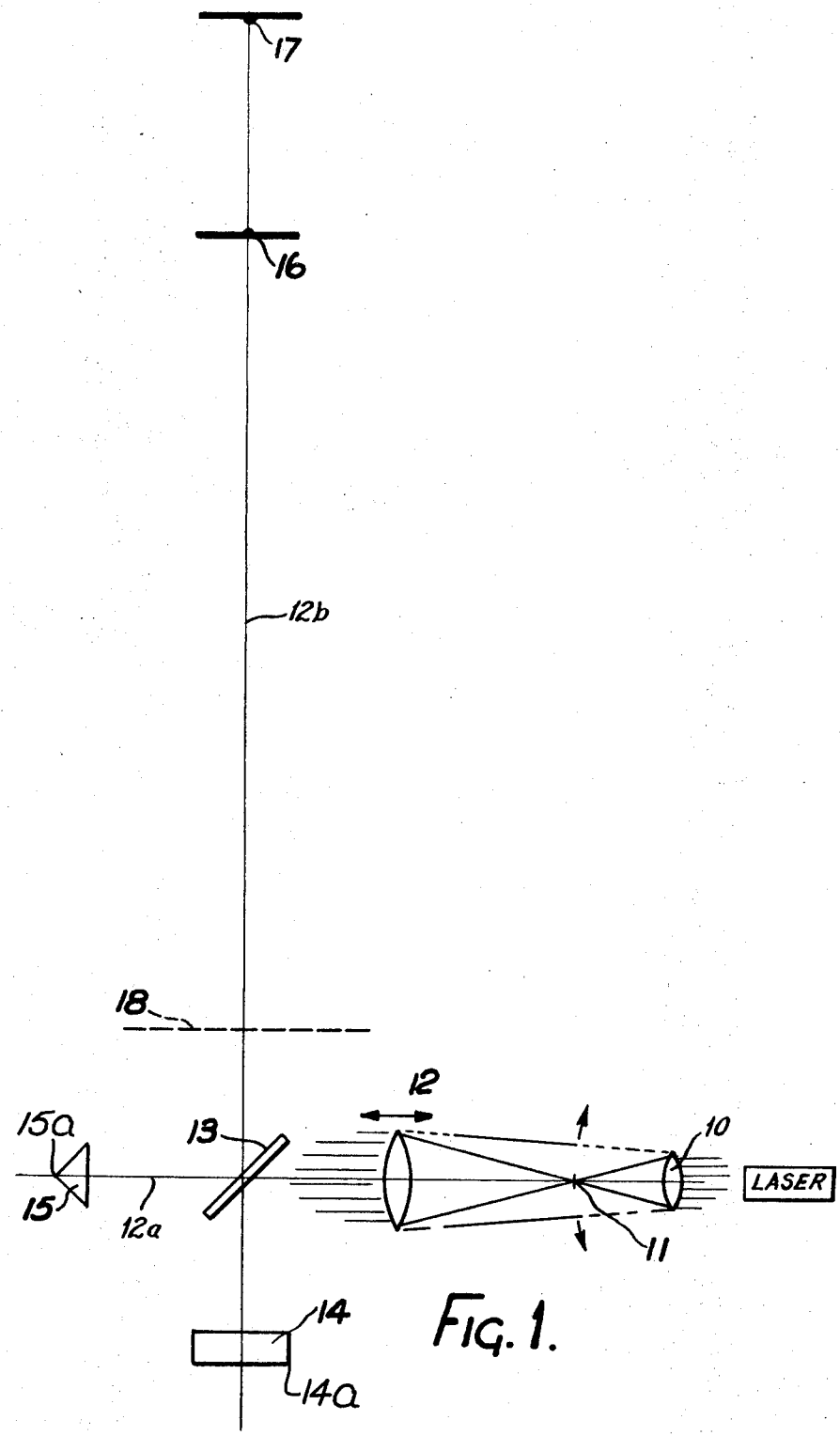

This invention relates to the investigation of positional relationships such as the alignment of adjustable parts of a structure, for example of the bearings of a machine, by optical methods.

Hitherto the most common optical method has been to set up a telescope with its axis positioned to define a reference axis and then to adjust the parts to be aligned until a target or targets on each part are seen by the observer to lie on the axis.

Since the telescope has to be focused on targets at various distances from the observer the maintenance of the axis unchanged is not without difficulty. A so-called alignment telescope with a focussing movement of especially accurate mechanical construction may be used, which maintains the axis in its original position throughout the range of adjustment. Alternatively, the telescope may sight through a fixed double image optical system, that is an optical system which when a beam is directed through it, divides the beam into two approximately equal beams which exhibit a symmetrical relationship with a separation which is a function of the departure of the entering beam from a direction independently defined by the optical system. The system may define a plane of symmetry or it may define an axis of symmetry. If in the former case the beam is directed along an axis in a particular plane or in the latter case along a particular axis, the two beams will be exactly superposed and effectively there will be a single emergent beam. Such optical systems are broadly known and usually consist of prisms, or prisms and mirrors. In the case of an alignment telescope, since the optical system is fixed, it defines a fixed plane or axis, and any departures of the telescope axis from the plane or axis of the optical system are made manifest by a double image and correction is applied by adjusting the alignment of the telescope until the two images become exactly superposed, a task which because the images are usually quite faint and lacking in contrast is burdensome and dependent on the subjective judgment of the observer.

Since some at least of the targets will usually be at considerable distances the method also usually requires a second operator additional to the observer to adjust each part in turn and a system of communication between the observer and operator, and it is a slow matter to achieve the accuracy of which the system is capable because of the difficulties of communication in addition to those of aligning the telescope. A micrometer eyepiece assists but adds to the burden on the observer.

Alignment has also been effected by the aid of an axicon, a device which provides an intense thin line of light which, if care is taken to avoid refraction effects, does provide a straight reference line, but this method has difficulties of its own, in particular that the line is a line of maximum intensity rather than an isolated line of light.

The present invention, while being akin to the use of a telescope, takes advantage of the properties of a single mode laser source of coherent radiation to simplify and speed up the operations without loss of the accuracy of which optical methods are capable. It does this by reversing the usual path of light, by substituting the laser source for the observer's eye and providing an optical system of the kind above set forth through which the laser beam is directed, thereby to define a fixed plane or line independently of the adjustment of the laser source. Such a combination has the advantage that the laser can be removed and replaced as may be convenient and that due to the highly coherent light from a laser, accurate coincidence of the axis of the laser beam with the plane or axis defined by the optical system can be very readily observed as will be explained later, while the brightness of the beam from a laser also makes observation easy when aligning movable parts by the aid of the invention.

A first object of the invention is to provide optical apparatus for use in an alignment system, comprising a single mode laser source of coherent light, a double image optical system, means for directing a beam of light from the laser source into the double image optical system, said system comprising components arranged so that said beam will give rise to two beams emerging from the system symmetrically disposed with respect to a geometrical datum, which may be an axis or a plane, defined by the system and with a separation dependent on the orientation of the first mentioned beam, and means for adjusting the direction of the first mentioned beam with respect to the double image optical system so that the axes of the two emerging beams may be brought into coincidence.

A further object is to provide a method of aligning adjustable parts with respect to a reference axis, comprising the steps of directing a beam of light from a single mode laser source of coherent light into a double image optical system which comprises components arranged so that said beam will give rise to two beams emerging from the system symmetrically disposed with respect to a geometrical datum which may be an axis or a plane defined by the system and with a separation dependent on the orientation of the first mentioned beam so that the axes of the two emerging beams are coincident, adjusting the optical system and the source so as to direct the superposed emerging beams along the reference axis, and adjusting each adjustable part with respect to the reference axis until the illuminated spot produced by the superposed beams falls at a predetermined position on that part.

Means such as a screen or target may be provided for ascertaining the position of intersection of the plane or line defined by the optical system with a transverse plane at a selected position at a distance from the optical system. Since a laser can produce a narrow beam, for many cases nothing more is needed. However, by introducing an adjustable focussing system, the size of the illuminated spot can be reduced and the focussing system can be adjusted to give maximum concentration at different distances in succession.

Figure 2:
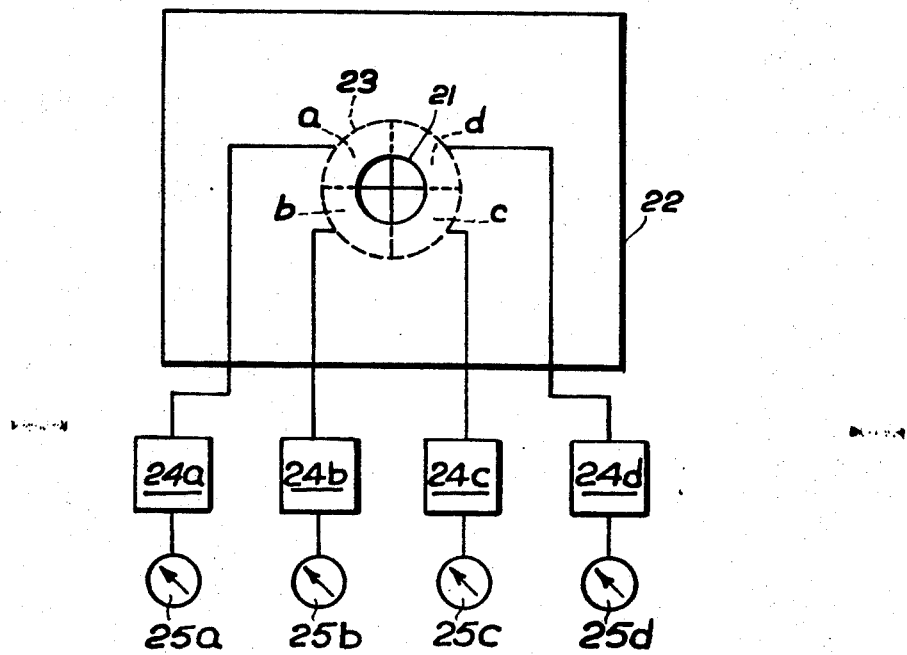

The invention will be further described with reference to the accompanying highly diagrammatic drawings in which FIG. 1 illustrates the essential parts of an aligning system according to the invention, and FIG. 2 illustrates a target with photo-electric means for ascertaining the precise position of the axis of the beam falling on the target.

Referring now to FIG. 1, the point source formed by concentrated light from a single mode laser by a collecting lens 10 is marked 11. The light is concentrated by a collecting lens 12 having a focussing adjustment, and the beam enters an optical system comprising a beam splitter plate 13 which divides the beam into two approximately equal beams, set at 45° to the direction in which the axis of the entering beam should lie, and two roof prisms 14 and 15 which lie respectively in the beam first reflected and first transmitted by the plate 13. The prism 14 has its ridge 14a in the plane of the drawing, and the prism 15 has its ridge 15a normal to the plane of the drawing so that the two ridges are perpendicular to one another and to the required axis of the two beams. Consideration will show that such a system has the property that although the entering beam is split at the plate 13 into two beams, if the axis 12a of the entering beam coincides with a particular axis which can be termed the axis of the system, the two emerging beams will be exactly superposed with their axes coinciding with the axis of the system, marked 12b. If the axis 12a does not coincide with the axis of the system, the two beams will emerge symmetrically placed with respect to the axis 12b, the separation of the two beams from the axis being a function of the inaccuracy in the adjustment of the axis 12a of the entering beam. Accordingly the mounting of the laser and the collecting lenses 10 and 12 are arranged to enable the entering beam axis 12a to be adjusted in relation to the system comprised by the components 13, 14, 15.

If a plane reflector is substituted for one of the roof prisms, the system instead of defining an axis will define a plane with respect to which the two emerging beams will be symmetrical. Thus if for example the plane reflector is substituted for the roof prism 14, the plane defined will include the system axis 12b and will be perpendicular to the plane of the drawing.

With the simple system shown, it is desirable that the two roof prisms should have accurate ridge angles otherwise each of the two beams will be split so that there will be four beams when the alignment of the entering beam axis is incorrect and two when it is. However, the practical effect of such small errors as would be met with in practice would not result in completely separated beams, but only in incompletely superposed beams, with a final beam after adjustment of the entering beam axis of non-circular cross-section.

For the work here in view it is desirable that the prism system should consist of components cemented together. A particularly suitable system of this character which consists of a rather larger number of components but has the merit that it will tolerate larger inaccuracies in the ridge angles of the roof prisms is disclosed in application No. 11,615/66.

With any of these systems if it so happens that the path distances within the system are such that destruction interference occurs in the emerging beam, this can be dealt with by effectively rotating the plane of polarisation of the light entering the system, suitable by interposing a half wave plate.

A screen 17 is set up at any desired distance, suitably at the far end of the distance over which the work is being done, and the focussing movement of the collecting lens 12 is used to concentrate the laser beam through the system 13, 14, 15 so as to form the smallest possible spot or pair of spots on the screen.

If there are two distinct spots this shows that the entering beam axis 12a and optical system axis or plane are not coincident but they are always disposed symmetrically to the axis or plane defined by the optical system. By adjusting the entering beam axis in relation to the optical system the spots can be caused to approach and, so far as observation of them shows, coincide. Exact coincidence can then be obtained by interposing any simple screen 18 such as a piece of paper in the emerging beam close to the optical system and then making a further adjustment to remove any tilt in the fringe pattern then observed, produced by the interference of the laser wave front with its own reversed or inverted self.

The focused image on the distant screen 17 is now a single spot lying on the line or plane defined by the optical system and if the screen 17 is provided with some form of index to make it a target, the spot can be brought to the desired position on the target by adjusting the laser, collimator and optical system as a unit, thereby establishing an alignment axis in known position.

A reference target provided in this way at the remote end of the distance enables the whole system to be checked from time to time and any drift in the mounting of the optical system to be corrected.

If now a part is to be aligned on the axis of the system, a screen such as 16 carrying a target may be attached to the part, and the collecting lens 12 is then focussed and adjusted to produce a minimum size single spot on the screen. The part can then be adjusted to bring the target on the spot. If the screen is not attached to the part, the screen is removed and the part with the target then adjusted to the spot.

The setting up of the distant screen, focussing, bringing of the collimator axis into coincidence with that of the optical system and adjustment of the part to be aligned is then repeated for each other part to be aligned.

With the present invention each target is brought to the spot by the operator at the target without the need for communication with an observer some distance away. In many cases the adjustment of the target can be effected by visual observation but if greater accuracy is needed photo-electric methods may be used, for example a target in the form of a small hole 21, FIG. 2, in an opaque screen 22 with a photo-electric cell 23 behind it divided into quadrants a, b, c, d together with amplifying circuits 24a, 24b, 24c, 24d and measuring instruments 25a, 25b, 25c, 25d which enable the output of each quadrant to be observed, thus enabling the location of the axis of the beam to be evaluated and the target or beam to be moved until the outputs of the quadrants are equal when the axis of the beam is central. If desired the circuits may be connected to form bridge circuits when the number of measuring instruments may be reduced. Indeed by connecting a pair of quadrants of a silicon photo-electric cell in opposition amplifying circuits can be eliminated and no more than a galvanometer is necessary, and by the provision of switches, a single galvanometer can be used in succession for each pair of quadrants. Circuits or connections of the kind required are in themselves well known and no detailed description is therefore necessary.

With regard to the laser source a gas laser running in a uniphase output mode at a power of about 200 μw. is very suitable for the present purposes. The so-called $TEM_{ooq}$ mode is readily produced and the beam shows a single spot with circular symmetry when intercepted by a screen, with an intensity variation along the radius according to a Gaussian relation, and by means of a four quadrant photo-electric cell and galvanometer the axis of maximum intensity can be reliably detected to within 10 microns at a distance of 46 feet (14 metres).

In the case of visual observation, the setting can be made by a jury, rather than a single operator if thought desirable. Also if the beam from the laser is focussed by a focusing lens it can be brought to a small diameter spot which is moreover amply bright to be observed in broad daylight; indeed even with a low-power laser direct observation must usually be avoided and setting must be effected photo-electrically or by diffuse reflection. For example with a collecting lens 2 inches (5 cms.) in diameter used over a distance of 200 feet (60 metres) the bright spot may be as small as 0.030 inch (0.75 mm.) diameter.

It will be clear that since the present invention is based on linear propogation of the radiation defining the axis of alignment it is subject to errors due to inhomogeneity (variations and fluctuations in refractive index and especially gradients in refractive index) of the medium in which the radiation is propagated. Even when the beam passes through air, however, errors will usually be very small since variations in refractive index are unlikely to be so distributed as to cause perceptible displacements of the beam. If necessary, however, the beam can pass between the positions of the various targets, through evacuated tubes having parallel end windows.

It will be clear that the terms "collimating system," "collimator" and "focussing" referred to herein mean an optical system which concentrates the light and which can be adjusted to get the greatest concentration at different distances from the source.

What we claim is:

1. Optical apparatus for use in an alignment system, said apparatus comprising:
   a single mode laser source of coherent light for providing a single input beam,
   optical means for defining first and second predetermined geometrical axes including means for splitting said single input beam into two exit beams, said optical means further directing the axes of said two exit beams symmetrically with respect to said second geometrical axis with a separation dependent upon the orientation of said single input beam with respect to said first geometrical axis,
   further optical means operatively positioned for directing said input beam of light from said laser source into said optical means in approximate alignment with said first geometrical axis, and
   adjusting means in an operative relationship for adjusting the direction of said input beam of light which respect to said optical means thereby permitting the axes of said two exit beams to be brought into coincidence along said second geometrical axis.

2. Optical apparatus as in claim 1 including target means remotely located from said optical means for ascertaining the position of intersection of said second geometrical axis with a plane disposed transversely thereto.

3. Optical apparatus as in claim 1 wherein said further optical means includes an adjustable focussing system disposed between said laser source and said optical means for minimizing the cross-section of said exit beams at a selected distance.

4. A method of aligning adjustable parts with respect to a reference axis, said method comprising the steps of:
   establishing first and second geometrical axes,
   aligning said second geometrical axis with said reference axis,
   providing an input beam of light from a single mode laser source of coherent light,
   splitting said input beam into at least first and second portions,
   directing said first and second portions to emerge as separate beams symmetrically disposed with respect to said second geometrical axis and with a separation dependent upon the orientation of said input beam with respect to said first geometrical axis,
   adjusting the orientation of said input beam to superimpose said separate beams into a common beam along said second geometrical axis, and
   adjusting each of said adjustable parts with respect to said reference axis until an illuminated spot formed by said common beam falls in a predetermined position on that part.

References Cited

UNITED STATES PATENTS

| | | |
|---|---|---|
| 2,571,937 | 10/1951 | Peck. |
| 2,583,596 | 1/1952 | Root. |
| 3,012,468 | 12/1961 | Magill et al. |
| 3,271,676 | 9/1966 | Chitayat. |
| 3,281,712 | 10/1966 | Koester _____ 331—94.5 |
| 3,366,792 | 1/1968 | Ohm _____ 331—94.5 |
| 3,358,243 | 12/1967 | Collins et al. _____ 331—94.5 |
| 2,952,779 | 9/1960 | Talley _____ 356—152 X |

OTHER REFERENCES

Optical Guidance of Vehicles, Measurement and Control, March 1964, pp. 97–98.

Tolansky: High Resolution Spectroscopy, Pitman Publishing Co., New York, N.Y., 1947 Ch. 9, pp. 140–143.

Ready et al.: Effect of Mirror Alignment in Laser Operation, Proc. IRE, vol. 50, No. 12, December 1962, pp. 2483–2484.

Electronics Review, Electronics, June 15, 1964, p. 28.

Harrihan, P. and Sen, D.: "Double-Passed Two-Beam Interferometers," Journal of the Optical Society of America, vol. 50, No. 4, April 1960, pp. 357–361.

RONALD L. WIBERT, Primary Examiner

T. MAJOR, Assistant Examiner

U.S. Cl. X.R.

356—153